United States Patent [19]

Haddock et al.

[11] Patent Number: 4,623,784
[45] Date of Patent: Nov. 18, 1986

[54] LASER RECORDING APPARATUS WITH OFF-CENTER LENS AND ERROR DETECTION

[75] Inventors: Richard Haddock, Redwood City; Terri Lichtenstein, San Mateo, both of Calif.

[73] Assignee: Drexler Technology Corporation, Mountain View, Calif.

[21] Appl. No.: 684,352

[22] Filed: Dec. 20, 1984

[51] Int. Cl.⁴ .............................................. G11B 7/00
[52] U.S. Cl. ........................................ 250/201; 369/44
[58] Field of Search ............... 250/200, 201, 552, 216, 250/568, 570, 578; 350/3.72, 3.73; 365/54, 200, 215, 216; 369/44, 45, 46, 122, 111, 112, 118, 120–121; 358/342

[56] References Cited

U.S. PATENT DOCUMENTS

| | | | |
|---|---|---|---|
| 4,145,758 | 3/1979 | Drexler et al. | 365/200 |
| 4,253,723 | 3/1981 | Kojima et al. | 350/3.72 |
| 4,283,777 | 8/1981 | Curry et al. | 365/215 X |
| 4,345,321 | 8/1982 | Arquie et al. | 369/46 |
| 4,458,980 | 7/1984 | Ohki et al. | 350/3.73 |
| 4,581,728 | 4/1986 | Nakamura et al. | 369/44 X |
| 4,592,038 | 5/1986 | Kabota et al. | 369/44 |

FOREIGN PATENT DOCUMENTS

| | | |
|---|---|---|
| 353696 | 6/1930 | United Kingdom . |
| 1458030 | 12/1976 | United Kingdom . |
| 1501141 | 2/1978 | United Kingdom . |
| 1551022 | 8/1979 | United Kingdom . |
| 1577877 | 10/1980 | United Kingdom . |

*Primary Examiner*—Eugene R. LaRoche
*Assistant Examiner*—D. Mis

[57] ABSTRACT

A laser recording apparatus for optically recording information on a medium. A laser radiates a beam through an off-center lens. The lens deflects and focusses the beam onto a recording medium at a slight angle. The reflected beam returns through the lens on the opposite side of the optic axis from the incident beam. A mirror in the optical path directs the beam to a photodetector. The apparatus has broadband capabilities and is particularly useful at eliminating unwanted optical feedback when recording onto media having a birefringent protecting layer. Recording errors due to dirt and scratches may be detected by a second embodiment that has two lasers emitting light of different frequencies which upon reflection are detected and compared.

7 Claims, 3 Drawing Figures

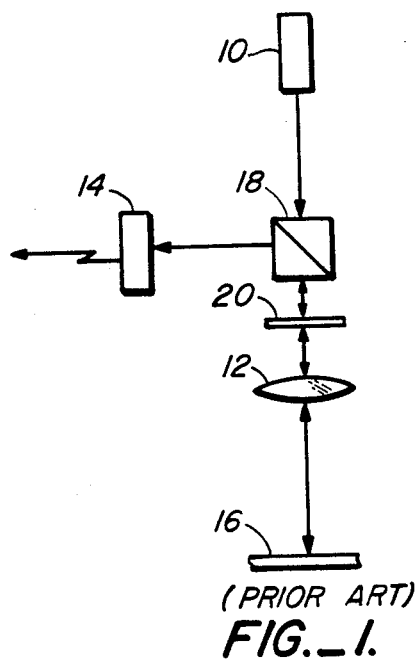
(PRIOR ART)
FIG._1.
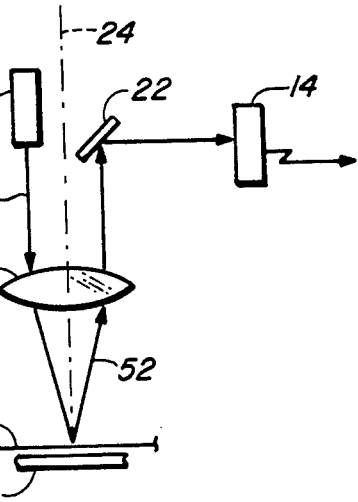
FIG._2.
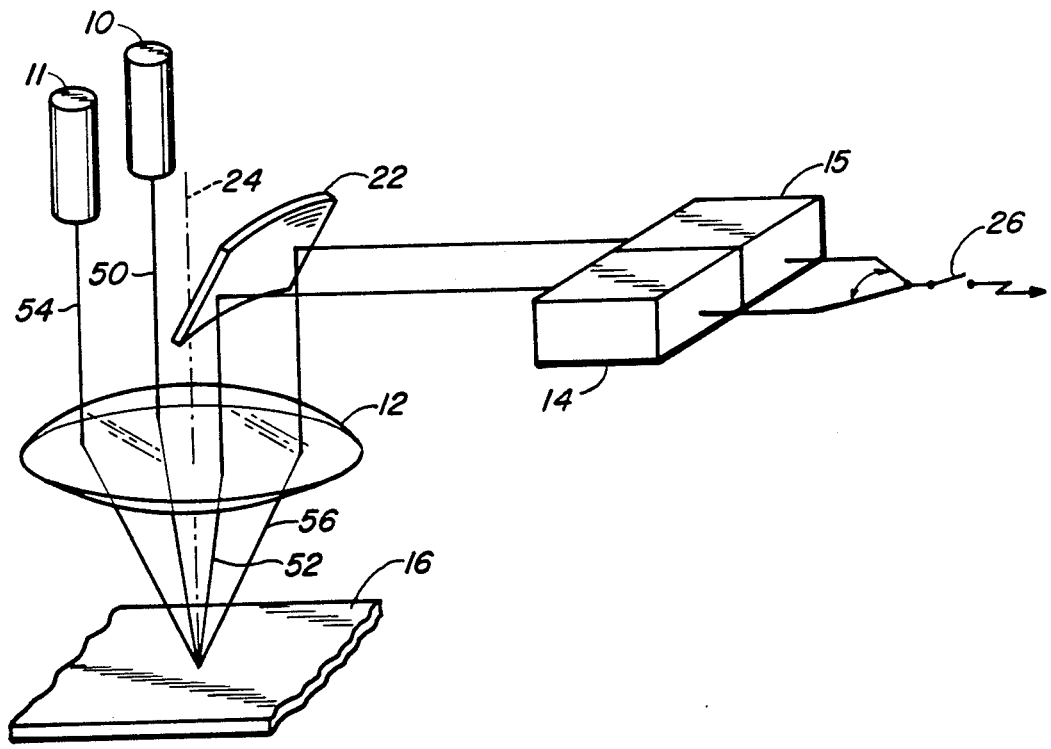
FIG._3.

LASER RECORDING APPARATUS WITH OFF-CENTER LENS AND ERROR DETECTION

DESCRIPTION

1. Technical Field

This invention relates to a laser recording system, and in particular to a system that eliminates optical feedback to the laser by deflecting the light beam with a lens.

2. Background Art

A typical laser recording system has a laser for producing a beam, a focussing lens for directing the beam onto a recording medium, and a photodetector for gathering light after impingement upon the medium. The laser is frequently a small semiconductor laser. The lens may be made of glass, or it may be a hologram lens in order to save space. The medium is often reflective and recording may be done by burning spots of different reflectivity into the medium. Light emitted by the laser is focussed onto the recording medium, and then upon scattering or reflection, is detected. It is important that light reflected by the medium is directed toward the detector and not back into the laser. Optical feedback to the laser can lead to unstable recording conditions and also lower the lifetime of the laser. This problem is especially serious for semiconductor lasers.

In reference to the prior art shown in FIG. 1, this problem is partially solved using polarization dependent components, such as a beam splitter 18 and a quarter wave plate 20 to establish and direct polarized laser light. The light's state of polarization is altered by quarter wave plate 20, reflects off the medium 16, returns through the quarter wave plate 20, and is deflected toward the detector 14 by polarizing beamsplitter 18.

One problem with this approach is that the polarization dependent components 18 and 20 are efficient only over a narrow wavelength band. A shift in wavelength of just a few nanometers can lead to feedback. Another problem is that many recording media are covered with a plastic protective layer which may be birefringent. The birefringent layer alters the state of polarization of the light so that the polarizing beamsplitter 18 is no longer efficient in directing all light toward the detector 14 and allows some light back into the laser, causing unwanted feedback results.

Ohki et al. in U.S. Pat. No. 4,458,980 show a similar configuration in which the quarter wave plate 20 and beamsplitter 18 in FIG. 1 are replaced by a hologram lens. A second hologram lens acts as the focusing lens. Kojima et al. in U.S. Pat. No. 4,253,723 describes an apparatus for reading data from an optical record medium. A hologram lens deflects and focusses light from a laser onto the medium. The medium reflects the incident light along a separate optical path. A second hologram lens deflects the reflected light toward a detector.

The problem with the Ohki et al. and Kojima et al. devices is that hologram lenses work only over a very narrow wavelength band. A shift in the laser light's wavelength of a few nanometers will cause fluctuations in the intensity of the recording beam. In addition, should a laser need replacing, the choice of replacement lasers would be limited to those with exactly the same wavelength.

For example, it is known that some semi-conductors shift wavelength as the power level is changed. Since a typical optical reading/recording system uses one laser power level for recording and a much smaller power level for reading, focussing and positioning, this wavelength shift can be quite serious. If narrow band optics, such as hologram lens are used, the focal length of the optics will change as the wavelength of the light beam shifts. The beam is focussed on a recording track using low power. But when the laser is switched to high power for recording, the beam goes off the track, by as much as five microns.

It is also desirable to check for errors while recording. Previously errors have been detected by direct comparison of the recorded information with the source of the information. This method requires time and special equipment. Further, it is desirable to distinguish errors in the recording itself, from errors due to dirt and scratches on the medium. One of the problems which occurs in reading differences in reflected light from the optical media is that it is difficult to distinguish between a change of reflectivity due to the presence of a spot and that due to the presence of dirt particles or material defects which might affect light scattering and absorption. Many optical recording media are protected from dirt and scratches by a plastic coating layer. Dirt deposited on the coating is mostly out-of-focus when the information is read, however, with data spots having dimensions of 50 microns or less, dirt and scratch errors may still be significant.

U.S. Pat. No. 4,145,758 to J. Drexler and C. Betz, assigned to the assignee of the present invention, for "Error Checking Method and Apparatus for Digital Data in Optical Recording Systems" describes a data reading system wherein digital data is written onto a transmissive medium, such as a photoplate, by a modulated laser whose beam is detected by a first photodetector means which measures laser output directed toward the recording medium. A second photodetector means measures light scattering from the medium, while a third photodetector detects and measures light transmitted through the recording layer of the medium surface to confirm recording of the data. Amounts of transmitted light or scattered light from the medium during the recording process are correlated to the laser output into expected values of light for detecting errors in recording immediately after the time of recording. This error detection system is intended for light transmissive media and would not be used in reading reflective media. Defects in the medium are detectable by the apparatus before laser recording errors are detectable.

Accordingly, it is an object of the present invention to attain a laser recording system that eliminates unwanted optical feedback to the laser, even when recording through birefringent layers.

It is a further object to attain a system that is both capable of using different wavelength lasers and does not depend on the polarization states of the laser beam.

Further, it is an object of the invention to detect errors while recording and to distinguish errors due to the medium from those due to dirt and scratches.

SUMMARY OF THE INVENTION

The present invention achieves these objects with a laser recording system having a single focussing lens that is aligned slightly off center with respect to the laser. Laser light incident on the lens is deflected. The light impinges upon the medium at a small angle, so it is not retroreflected towards the laser. Instead, the reflected beam is bent again on the opposite side of the lens, far enough removed from the incident beam to avoid the unwanted feedback. The light that exits the lens is either detected by a photodetector or directed to a photodetector by a simple mirror, in either case preventing the light from reflecting into the laser.

The invention employs different wavelengths generated by two lasers directed at the same spot and detected sequentially, one of which is red or infrared, the other of which is green, blue or ultraviolet. Spots in the medium will reflect both beams in known amounts. Dirt and scratches, however, tend to scatter light and to scatter one color more than another. This difference can be detected by comparing the amount of light reflected by each of the two lasers.

Because the system uses mirrors and ordinary lens with broadband capabilities, the invention has the advantage of being both polarization insensitive and wavelength insensitive. Birefringence and laser wavelength variations have no effect on the amount of light reaching the medium. Feedback is eliminated so the recording conditions are more stable and the laser lasts longer. Two lasers of different wavelengths can be used simultaneously to detect and distinguish errors.

BRIEF DESCRIPTION OF THE DRAWINGS

FIG. 1 is a schematic diagram showing a prior art laser recording system.

FIG. 2 is a schematic diagram of the present invention.

FIG. 3 shows a profile schematic diagram of a second embodiment.

BEST MODE FOR CARRYING OUT THE INVENTION

In reference to FIG. 2, a laser 10 radiates a laser beam 50 through a lens 12 onto a reflective recording medium 16. The lens is situated in the path of the beam 50 with its optic axis 24 parallel to and off center from the beam path 50. The lens 12 deflects and focusses the beam 50 onto the recording medium 16. The lens is broadband so that a laser beam of any wavelength may be used. The beam 50 typically records by forming pits or other optically identifiable marks in the medium 16. The medium 16 usually has a protective plastic surface layer 17 to keep dirt and scratches from destroying data. This layer 17 is often strongly birefringent. This invention has the advantage that birefringence has no adverse effect, because the apparatus is free of polarization dependent components. The beam 50 strikes the medium 16 at a slight angle so it is reflected along a different optical path than the incident beam. The reflected beam 52 is then detected by a photodetector 14 in the path of the reflected beam 50. Preferably, the reflected beam path 52 goes through the lens 12 and is reflected by mirror 22 before reaching the photodetector 14. The reflected beam path 52 should traverse the lens 12 on the opposite side of the optic axis 24 from the incident beam path 50, and should be far enough away from the incident beam path 50 to avoid optical freedback to the laser 10.

In reference to FIG. 3, a red laser 10 and a blue laser 11 emit a red incident beam 50 and a blue incident beam 54. An infrared laser may be used in place of a red laser, and a green or ultraviolet laser may replace the blue laser. A lens 12 is situated in the path of the beams 50 and 54. The optical axis 24 of the lens 12 is parallel and off center with respect to the beams. The beams are parallel and equidistant to the axis 24. The lens deflects and focusses the beams to a common point 30 on the medium 16. The beams are reflected, and the reflected beams 52 and 56 pass through the lens 12 on the opposite side of the optic axis as their corresponding incident beams 50 and 54. A mirror 22 directs the reflected beams 52 and 56 toward detectors 14 and 15. This mirror may be a curved mirror or a planar segmented mirror or a pair of mirrors for directing the two beams to the two detectors. A switch 26 alternately selects the detector signal to be analyzed. Alternatively, a single detector 14 may detect both beams 52, 56 with the lasers 10, 11 being switched on and off in sequence, or with the mirror being curved or moved back or vibrated.

The apparatus checks for errors immediately after writing by comparing the amount of light received by the photodetectors. Different characteristics of the medium are associated with beams of different wavelengths of light. The medium reflect the two beams by known amounts. The read beams impinging or recorded spots have greatly altered specular reflection due to scattering and absorption by the spots in the medium. Changes in reflectivity are measured by photodetectors and converted to electrical impulses corresponding to data, which can be compared with the information in memory.

Imperfections, scratches and foreign particulate matter, such as dirt on the medium scatter the light beams away from the photodetectors. Short wavelength light, such as that from the blue beam is scattered by dirt more than long wavelength light. The amounts of measured light from the beams of different wavelengths are compared and then checked against expected values. The first photodetector measures the red beam and the second photodetector measures the blue beam.

The presence of both beams indicates that the light source is writing optical data. The absence or low level of both beams indicates a recording error due to a lack of proper light beam output pulse from the lasers. Dirt is indicated when the ratio of the intensities of blue to red light deviates from the expected value. The object of the measurement is not only to determine the existence of reflected beam signals, but to ascertain that the signal levels are within set tolerances with reference to expected or desired signal levels.

In the event that an error is detected, data is re-recorded elsewhere on the medium, and a data flag is recorded to mark the location of the error. Optionally, redundant recording provides greater accuracy, but takes up more storage space.

We claim:
1. An optical laser system comprising,
   a first laser emitting a first incident laser beam of a first wavelength on a first optical path,
   a second laser emitting a second incident laser beam of a second wavelength on a second optical path, said second beam being parallel to said first beam,
   a broadband lens capable of transmitting light of both said first wavelength and said second wavelength for deflecting and focussing said beams onto a common point of a medium, said lens being positioned in the first and second paths of said incident beams with the optical axis of said lens being parallel to, equidistant from, and off center from said first and second incident beams, said beams being redirected at the common point onto third and fourth optical paths separate from the first and second paths of said incident beams, said third and fourth paths of said redirected beams traversing said lens at points opposite the said optic axis from said corresponding incident beams, and at least one photodetector in the third and fourth paths of said redirected beams.

2. The system of claim 1 where the number of photodetectors is one.

3. The system of claim 1 where the number of photodetectors is two.

4. The system of claim 2 where a mirror is positioned in the third and fourth paths of said redirected beams and is spherically curved to direct said beams to the said photodetector.

5. A method for using two lasers in recording data on a medium and checking for errors while recording comprising, emitting two parallel, spaced beams of laser light of different wavelengths on respective first and second light paths, directing and focussing said beams onto a common point of a medium, portions of the laser light from both of said beams being reflected at the common point onto third and fourth light paths separate from said first and second light paths, measuring the intensities of said reflected portions of said beams, and comparing measurements of the intensities of said reflected portions of said beams with each other and with set value ranges of said measurements for generating error signals.

6. The method of claim 5 wherein directing and focussing two beams onto a common point of a medium comprises, sending said beams through a focussing lens, said beams impinging on said lens parallel to and spaced equidistant from the optical axis of said lens.

7. The method of claim 5 wherein the intensities of said reflected portions of said beams are measured by photodetectors placed in the third and fourth light paths of said reflected beams.

* * * * *